United States Patent
Khoo

(10) Patent No.: US 11,100,274 B2
(45) Date of Patent: *Aug. 24, 2021

(54) SYSTEM AND METHOD FOR INTERACTIVE EMAIL

(71) Applicant: Justin Khoo, San Francisco, CA (US)

(72) Inventor: Justin Khoo, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,782

(22) Filed: Dec. 8, 2019

(65) Prior Publication Data

US 2020/0110791 A1 Apr. 9, 2020

Related U.S. Application Data

(63) Continuation of application No. 15/654,551, filed on Jul. 19, 2017, now Pat. No. 10,509,848.

(60) Provisional application No. 62/366,063, filed on Jul. 24, 2016.

(51) Int. Cl.
| | |
|---|---|
| *G06F 15/16* | (2006.01) |
| *G06F 40/106* | (2020.01) |
| *H04L 12/58* | (2006.01) |
| *H04W 84/00* | (2009.01) |
| *G06Q 10/10* | (2012.01) |
| *G06F 40/169* | (2020.01) |
| *G06F 40/174* | (2020.01) |
| *G06F 16/955* | (2019.01) |

(52) U.S. Cl.
CPC .......... *G06F 40/106* (2020.01); *G06F 40/169* (2020.01); *G06F 40/174* (2020.01); *G06Q 10/107* (2013.01); *H04L 51/063* (2013.01); *H04L 51/18* (2013.01); *H04W 84/005* (2013.01); *G06F 16/9566* (2019.01)

(58) Field of Classification Search
None
See application file for complete search history.

(56) References Cited

U.S. PATENT DOCUMENTS

| | | | |
|---|---|---|---|
| 2002/0104017 A1* | 8/2002 | Stefan | H04L 63/0209 726/13 |
| 2007/0106952 A1* | 5/2007 | Matas | G06F 16/9577 715/764 |
| 2008/0127341 A1* | 5/2008 | Chen | G06F 21/83 726/22 |
| 2012/0084835 A1* | 4/2012 | Thomas | G06F 16/9535 726/3 |
| 2014/0195675 A1* | 7/2014 | Silver | H04L 65/607 709/224 |

(Continued)

*Primary Examiner* — Quang N Nguyen
(74) *Attorney, Agent, or Firm* — Ellenoff Grossman & Schole LLP; James M. Smedley; Alex Korona

(57) ABSTRACT

A system and method are disclosed for providing an enhanced email client having interactive content capabilities. The system includes a recipient email server for receiving emails from a sender email server and for receiving dynamic interactive content from a third party content service provider when it is determined that the email includes capabilities for displaying interactive content. The method includes steps of sanitizing a received email at a user's computing system, checking the sanitized email to determine if it contains interactive content, and retrieving the interactive content in the sanitized email without requiring the user to click out to a separate window or browser instance.

18 Claims, 13 Drawing Sheets

(56) References Cited

U.S. PATENT DOCUMENTS

2015/0095073 A1* 4/2015 Li ................. G06Q 10/025
705/6
2015/0373010 A1* 12/2015 Zhang ............. H04L 63/083
726/7

* cited by examiner

```
700 — <html>
      <body>
      <center>
701a —     <a href="http://server/dog.html"  data-content-target="foo" >Dog</a>
701b —     <a href="http://server/cat.html"  data-content-target="foo" >Cat</a>
701c —     <a href="http://server/bird.html" data-content-target="foo" >Bird</a>
702 — <div id="foo" style="border:1px solid black;">
703 — Pick an option above
      </div>
      </center>
      </body>
      </html>
```

Fig. 7a

```
<div class="payload" style="background-color:yellow;">
This is a cute puppy<BR>
<img src="http://server/puppy.jpg">
</div>
```

```
<html>
<body>
<center>

Travel Book. Pick Your City:<BR>

<form action="http://server/findcity" data-content-target="foo">
<input type="text" name="city">
<input type="submit" value="Go">
</form>

<div id="foo" style="border:1px solid black;">
Pick a city and click Go
</div>

</center>
</body>
</html>
```

```
<div class="citydata" style="background-color:yellow;">
<B>London</B> is a very cool city<BR>
<img src="http://server/london-tower-bridge.jpg">
</div>
```

Fig. 9b

SYSTEM AND METHOD FOR INTERACTIVE EMAIL

CROSS-REFERENCE TO RELATED APPLICATIONS

This application is a continuation and claims the benefit of U.S. application Ser. No. 15/654,551, titled "System and Method for Interactive Email," filed by Justin Khoo, on Jul. 19, 2017 issued as U.S. Pat. No. 10,509,848 on Dec. 17, 2019, and of U.S. Provisional Application No. 62/366,063, titled "System and Method for Interactive Email," filed by Justin Khoo, on Jul. 24, 2016, the entire disclosures of which are herein expressly incorporated by reference.

FIELD OF INVENTION

The present invention relates generally to the field of email communications, and more particularly to securely displaying interactive, dynamic content to a user, without requiring the user to click out to a separate window or browser instance.

BACKGROUND OF INVENTION

Although modern emails contain HTML, there are a few key differences between emails containing HTML and web pages. One key difference is that, unlike web pages which routinely include JavaScript, the use of JavaScript is generally prohibited within emails. As such, interactivity within emails is limited to what is achievable with CSS. Another key difference is as a consequence of the inability to use scripts within emails, content within emails is static such that in order to view additional content beyond what is initially shown to a user, the user typically has to click out to a separate window or browser instance.

There have been attempts to mitigate both of the aforementioned limitations, however, these attempts have been generally complex to implement and suffer from many drawbacks. For example, attempts have been made to allow emails to incorporate scripts such as JavaScript that are pre-vetted or sandboxed. Sandboxing of scripts usually involve using iframes or complex pre-processing of JavaScript that is error prone and adds overhead to the email client. Another proposed solution of the prior art is the use of third party scripts, however, they are inherently dangerous as it opens up the email to various vectors of malware attack. Further attempts have been made to include external CSS files and images that can be modified after the email is sent, however, such attempts have proven to be very limiting and complicated to execute.

Therefore, there is a need in the art for a system and method for enhancing email technology to allow emails to be able to retrieve new interactive and/or dynamic email content after an email has been received by an email client and opened and displayed within the same email of the email client upon an interaction event by a user.

The present invention solves these and other problems in the art.

SUMMARY

Embodiments of the present invention provide a systems and methods for securely transmitting and displaying interactive emails that display interactive and/or dynamic content by an enhanced email client, upon an interaction event with a user. A key feature of the invention is the display of the display interactive and/or dynamic content by the enhanced email client without requiring the user to click out to a separate window or browser instance. More particularly, upon detecting an interaction event from a user by an enhanced email client, interactive and/or dynamic content (including HTML content) may be remotely retrieved and opened by the email client for display within the email without requiring the user to click out to a separate window or browser instance.

According to a first aspect of the invention, the system comprises a sender email server application operable on a server on a network, a recipient email server hosting an email client application for receiving an email message sent from the sender email server, and a remote content server for providing interactive content to the recipient email server upon an email interaction event with a user at the email client or technically known as a message user agent (MUA).

According to another aspect of the invention, annotations of elements are used within an email that instructs the email client to the location of interactive content as well as the target element to display the interactive content within the email when an interaction event is triggered on the annotated element. This allows new content to be dynamically retrieved by the email client, sanitized and displayed within the same email without requiring the user to click out to a separate window or browser instance.

According to another aspect of the invention, the email client is capable of intercepting the default actions of annotated links and forms to make them interactive thereby enabling the links and forms to retrieve or submit content as a proxy and populate content into elements within the email itself.

According to yet another aspect of the invention, a method of processing an interactive email containing interactive elements is described. The method can include sanitizing email content, determining if the email is an interactive email and validating and enabling the interactive content when it is determined that the email is an interactive email.

In another aspect of the invention, a method of handling an interactive event within an email is described. The method can include a user interacting with an opened email in an email client. The method can further include checking the interactive event to determine if the interactive event if one for which the application has registered interactive event listeners. The method can further include the email client intercepting the event thereby preventing the event from being handled by the default event handler, when it is determined that it is an event for which it has registered listeners. The method can further include determining whether the event originates from an interactive link or a submission from a form.

BRIEF DESCRIPTION OF THE DRAWINGS

FIG. 7a is an exemplary embodiment of code segments employed for an interactive email containing links of FIG. 6a.

FIG. 7b is an exemplary embodiment of code segments employed for content fetched by an interactive email from a remote content provider of FIG. 6b.

FIG. 9a is an exemplary embodiment of code segments employed for markup within an interactive email containing form elements of FIG. 8a.

FIG. 9b is an exemplary embodiment of code segments employed for content fetched by an interactive email as a result of form data being sent of FIG. 8b.

DETAILED DESCRIPTION OF THE INVENTION

In the description above, the detailed description, the claims below, and in the accompanying drawings, references is made to particular features (including method steps) of the various embodiments of the invention. It is to be understood that the disclosure of the invention in this specification includes all possible combinations of such particular features, for example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The system of the present invention performs numerous functions in providing for the transmission, identification and deployment of emails capable of displaying interactive and/or dynamic content without requiring the email client to click out to a separate window or browser instance. These functions are preferably divided up and encapsulated into a number of server and client applications. Each application is configured to retrieve and manipulate information in storage devices and exchange information through a network.

Although the schematic overview shows application and storage systems tied to physical servers, multiple instances of the applications may be deployed over multiple servers, which may themselves be virtualized instances running on shared hardware resources connected to a Network. One of ordinary skill in the art would understand that any number of computing devices could be used as servers, and embodiments of the present invention are contemplated for use with any such computing device or distributed network of such devices that may be sharing common resources.

Figure 1:
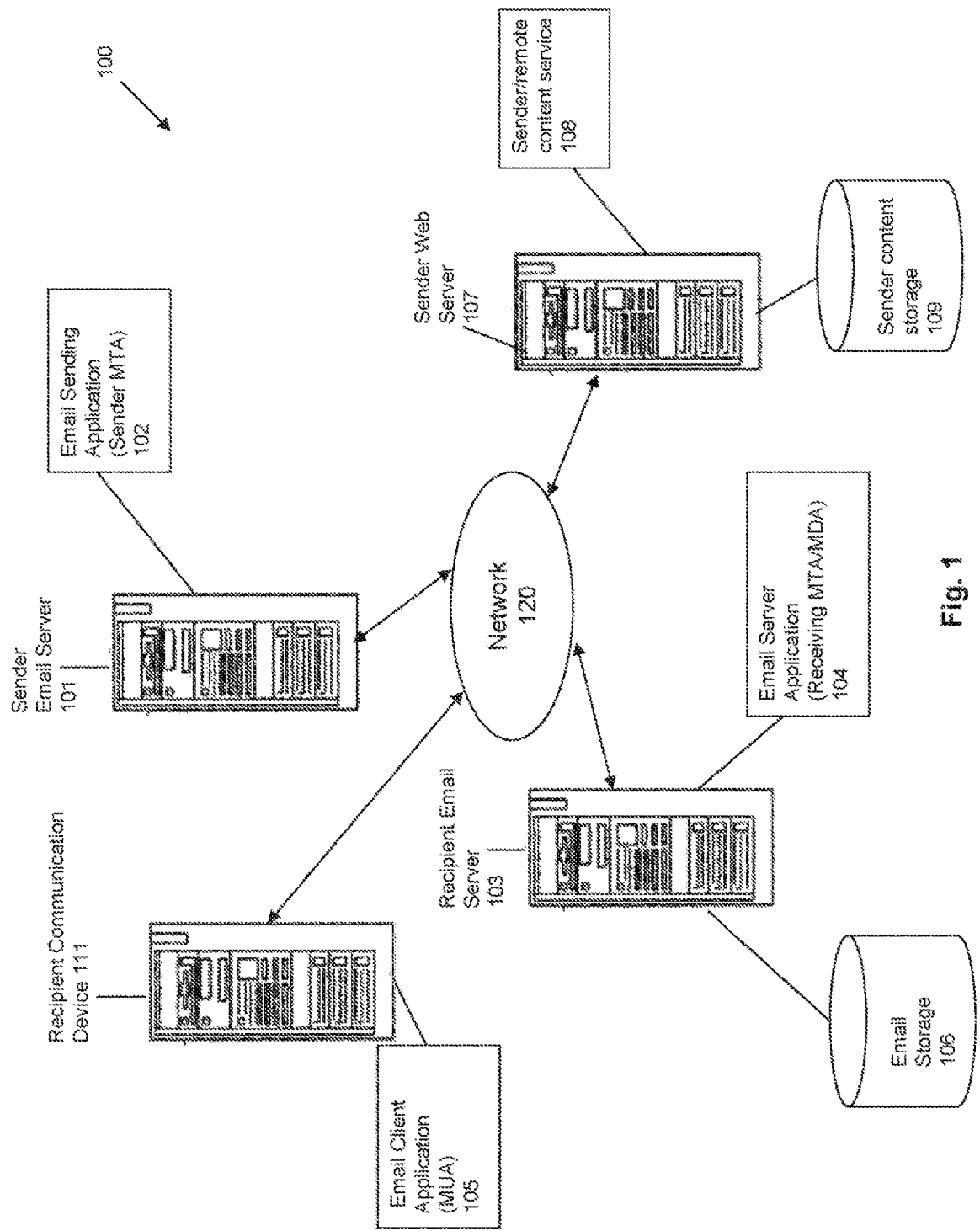
FIG. 1 illustrates a schematic overview of a computing device, in accordance with an embodiment of the present invention.

The present technology will now be described with reference to FIGS. 1-9, which in general relate to a system and method for providing enhanced emails with a capability for retrieving interactive and/or dynamic content upon a user interaction event, after an email has been received and opened in an email client. A key feature of the invention is the display of the interactive and/or dynamic content to an email client without requiring the email client to click out to a separate window or browser instance. Referring initially to FIG. 1, there is shown an embodiment for implementing the present technology including a sender's email server 101, a recipient's email server 103, a sender web server 107 and one or more recipient's communication devices capable of receiving electronic mail or instant messages, such as a recipient communication device 111. Other recipient communication devices may include, for example, a wireless personal digital assistant, a Web-enabled wireless telephone, a pager, cellular phone, modem equipped PDA, and so forth. The system 100 is coupled together by network 120. Network 120 can include any type of wire or wireless communication channel capable of coupling together computer systems. This includes, but is not limited to, a local area network, a wide area network, or a combination of networks. In one embodiment of the present invention, network 120 includes the Internet. Network 120 can also include a communication pathway through a telephone line. While one server sender's email server, recipient's email server, and sender web server is shown, more than one sender's email server, recipient's email server, one or more recipient's may be used in further embodiments.

Web server 107 may be used to process requests for content from recipient email server 103, and recipient communication device 111. Web server 107, can be running an operating system, which can be any commercially-available operating system. Web server 107 can also run a variety of server applications, including HTTP servers, FTP servers, CGI servers, database servers, JAVA servers, and the like. Web server 107, which, in addition to an operating system, can include a sender remote content service 108. The remote content service 108 accepts requests sent by an Email Client Application 104, 105 and returns content that gets populated in an interactive email.

Sender email server 101 may be used to send emails to recipient email servers 103 and recipient communication devices 111, such as a computer or wireless device. Sender email server 103, can be running an operating system, which can be any commercially-available operating system. Sender email server 103, which can, in addition to an operating system, include and email sending application (e.g., sender MTA) 102.

Recipient email server 103 may be used to receive emails from sender email server 101. Recipient email server 103, can be running an operating system, which can be any commercially-available operating system. Recipient email server 103, which can, in addition to an operating system, include and email receiving application (e.g., MTA/MDA) 104, accessible by a email client 105 coupled to a recipient communication device 111.

The exemplary system 100, illustrates how an email from an email sending application 102 is sent via a sender email server 101 to be received at a recipient email server 103 by an email server receiving application MTA 104 or Message Transfer Agent (MTA) 104, such as Postfix™ or Sendmail™, and stored in an email storage 106 to allow a user access to their emails. When a user accesses their email, the user uses the email client application or Message User Agent (MUA) 105 such as Gmail™ or Microsoft Outlook™. It can be appreciated that Web-based email clients may involve a user using a Web browser to access the Web-based email client hosted on a web server resident on a recipient communication device 111 that is coupled to the recipient email server 103.

Data may be provided to the system, stored by the system and provided by the system to users of the system across local area networks (LANs) (e.g., office networks, home networks) or wide area networks (WANs) (e.g., the Internet). The system may be comprised of numerous servers communicatively connected across one or more LANs and/or WANs. One of ordinary skill in the art would appreciate that there are numerous manners in which the system could be configured and embodiments of the present invention are contemplated for use with any configuration.

As used herein, the term "server" is used to refer to any type of data processing device that is connected to a node on a network for providing services to client devices on the network. The term "web browser" relates to any application capable of consuming and parsing HTML content. Such web browsers may include, for example, a fully-fledged web-browser, such as Firefox® or Chrome®, a component within an application such as the HTML rendering component in Microsoft® Outlook® or the iOS® Mail application, or a component without a user-interface such as a headless WebKit engine. The term Client relates to any email client, however, client can be interpreted in a broader manner to address other container of HTML content. As used herein, the term "interactive element" is any element that a user can interact with, including, for example, a link, a form, a button. As used herein, an "email client" is used to refer to a standalone email client on a device, such as Microsoft Outlook, or a Web-based email application such as Gmail where the application is accessed through a browser and interacts with a server component, where both components collectively make up the email client, or any application that is capable of rendering a received email. The "email client" can also reside on any device, but not limited to, a PC, a mobile device, a tablet and a watch. As used herein, the term "email client" and "enhanced email client" refers to a standalone email client on a device such as, for example, Microsoft Outlook™ or a Web-based email application such as Gmail™ where the application is accessed through a browser and interacts with a server component (both components make up the email client) or any application that is capable of rendering a received email. It is contemplated that the email client may be stored on any device including, but not limited to, a PC, mobile device, tablet and watch.

Figure 2:
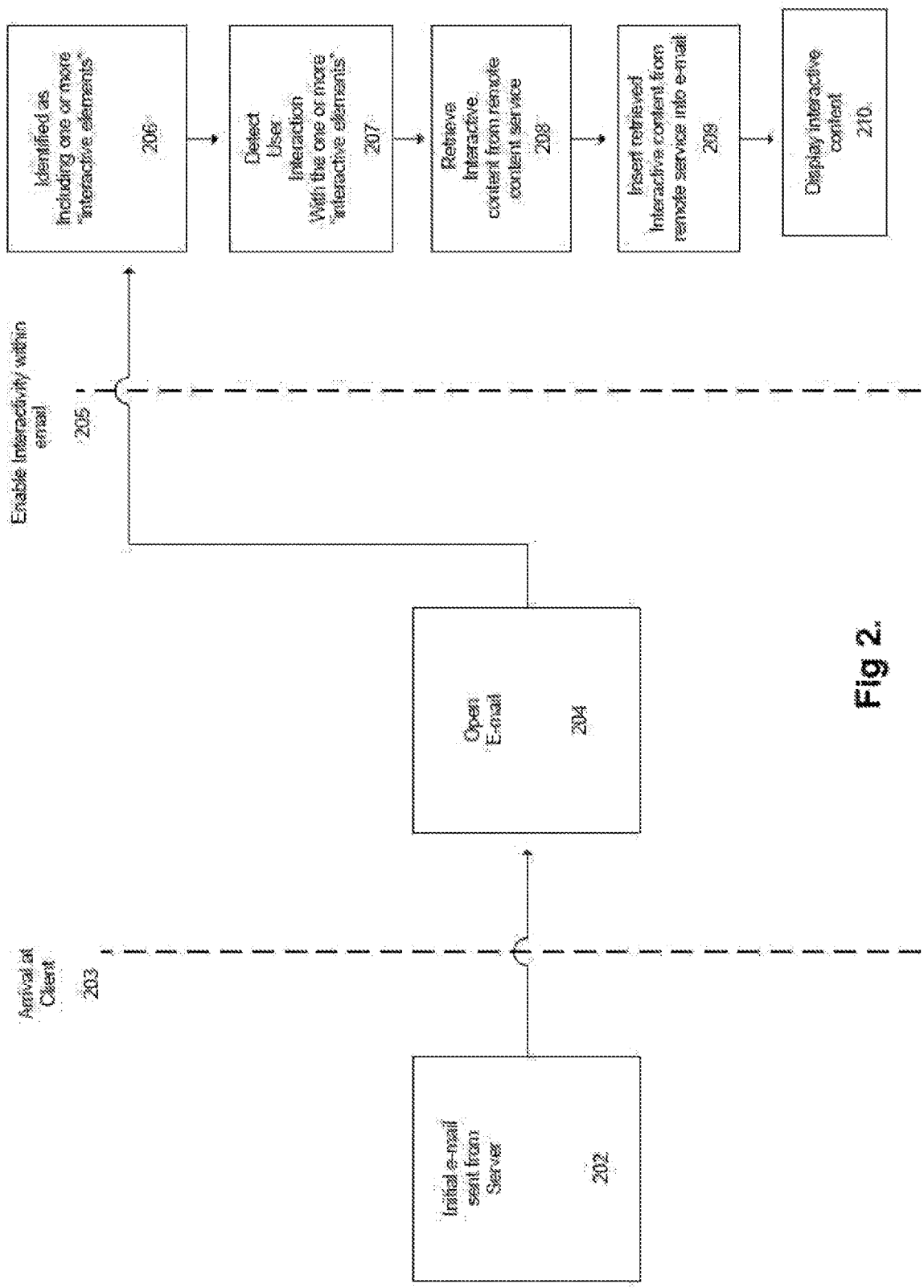
FIG. 2 illustrates a network schematic of a system, in accordance with an embodiment of the present invention.

Referring now to FIG. 2, there is shown a conceptual illustration of the processing performed by computer programs executed by a digital computer included in recipient email server 103 and recipient communication device 111 in an interactive email communication suitable for illustrating selected components of the present invention. In FIG. 2, interactive email communication sequence 200 includes email 202 representing the original email. Original email 202 represents an email generated by its author.

As illustrated in FIG. 2, original email 202 ultimately results in the addition of additional content without requiring the user to click out to a separate window or browser instance.

Item 202—Initial email sent from sender email server 101.

This item represents an e-mail (or other electronic message) sent from sender email server 201.

Item 204—email arrives at enhanced client.

This item represents the arrival of a generated email at the enhanced client.

Item 206—Identified as including one or more interactive elements.

This item illustrates the fact that all incoming emails sent from sender email server 101 are inspected and are identified as "interactive" when the enhanced email client application 105 detects the presence of one or more interactive elements.

Item 207—Detect user interaction.

This item illustrates a detection event associated with the user clicking on one of the interactive elements displayed by the enhanced client.

Item 208—Retrieve interactive content from remote server associated with detection event.

This item illustrates the retrieval of the interactive content associated with the interactive element clicked on by the user.

Item 209—Insertion of retrieved interactive content into email.

This item illustrates the insertion of the retrieved content into the email.

Item 210—Display interactive content to user.

This item illustrates the display of the interactive content to the user without requiring the user to click out to a separate window or browser instance.

In general, the system and methods provided herein are applicable to users of computing devices that are connected and disconnected to a network. According to an embodiment of the present invention, in the case where the computing devices are disconnected to a network, some of the applications of the present invention may not be accessible, however, a user may still be able to compose data offline that will be used by the system when the user is later connected to a network.

Figure 3:
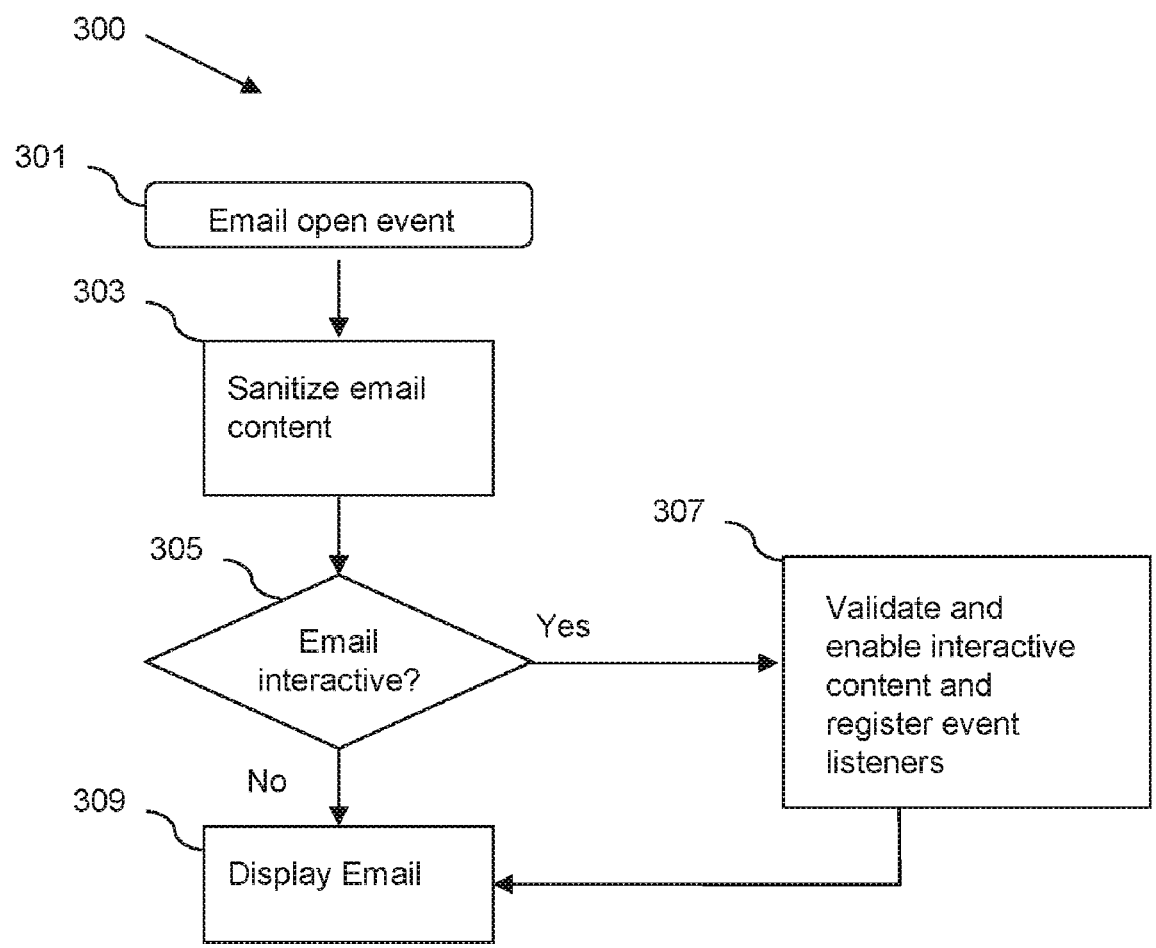
FIG. 3 is an illustration of an exemplary process flow, depicting the process of processing an interactive email containing interactive elements, in accordance with an embodiment of the present invention.

FIG. 3 is a flowchart illustrating an exemplary process flow 300 depicting the process of displaying an email containing interactive elements in accordance with an embodiment of the present invention. The process begins with a user interaction event comprising an email being opened by a user (step 301). The content of the opened email is then sanitized to ensure that the email content is safe to display to the user (step 303). Sanitization can be performed in a number of different ways including, for example, stripping the email content of disallowed content such as scripts that can be natively executed by a Web Browser such as JavaScript, certain CSS styles, certain HTML elements such as iframes and other potentially malicious content. Additionally, for Web based email clients, sanitization may be performed by modifying the class and id attributes of elements to ensure that they do not conflict with class and id attributes of elements used by the web based email client itself. This can be achieved by prepending or appending class and id attributes with a unique identifier string such as "yahoomail_".

After completing the sanitization process at step 303, the sanitized email is then checked (step 305) to determine if it contains any interactive email content by locating annotation of elements within an email which may include links or forms annotated with the data-content-target attribute. The invention also contemplates the use of other checking methods to determine if it contains any interactive email content such as, for example, including meta-data within an email header or other portions of the email to mark that an email contains interactive content.

If it is determined at determination step 305 that an email contains one or more interactive elements, the interactive content is then validated and enabled (step 307). In one embodiment, enablement may consist of registering event listeners to trigger when events such as form submissions or element clicks are detected. In another embodiment, not shown in FIG. 3, the email client registers user interaction events tied to elements annotated with a data-content-target attribute.

In another embodiment, not shown in FIG. 3, the process of validating an email that contains one or more interactive elements may include ensuring that the element id referred to in the data-content-target attribute exists and that URLs to fetch remote content are formatted correctly. In another embodiment, the process of validating an email that contains one or more interactive elements may involve ensuring that the email has passed email authentication checks such as DomainKeys Identified Mail (DKIM).

In another embodiment, not shown in FIG. 3, the process of validating an email that contains one or more interactive elements may also include ensuring that the sender has been preapproved to send interactive content by looking up a record for the sender in a whitelist. The whitelist may include the sender's email address or the sender's authenticated domain. Should the email or elements within the email fail validation, the email may be treated as a non-interactive email with the event listeners not being registered and interactivity being disabled.

In an embodiment, not shown in FIG. 3, the enhanced email client may also add special CSS class or id attributes to the body or outer container of an email when interactivity is enabled so that the email content can leverage CSS to either display or hide elements depending on whether or not the interactive capability is present. For example the enhanced email client could add the class "is_interactive" to a div wrapping the email content and interactive content can be CSS styled to only be displayed when the "is_interactive" class is present. This is illustrated by way of example in the code below. In this template, consecutive lines of code have been annotated with consecutive numbers to facilitate ease of reference. These numbers do not appear in the production codes.

```
1    <style>
2    .interactive_content{display:none;}
3    .is_interactive .interactive_content{display:block!important}
4    </style>
```

The code illustrates an embodiment of a CSS style block within an email that includes interactive content. The CSS style block hides those elements with an "interactive content" class name as shown in code line 2. However should the element reside in a wrapper or parent element with an "is_interactive" class name, the element will be displayed as shown in code line 3. When the email is rendered in a regular email client without interactive capability, elements with "interactive content" will not be displayed since the "is_interactive" class would not be appended to a wrapping element of the email content.

In another embodiment, another method that may be used to hide interactive content from email clients that do not support interactive email is to place interactive content within a conditional comment. Conditional comments are comments that are content blocks that appear as comments to regular email clients but contain instructions or meta-data that is recognized by email clients that support interactive content to process content within said conditional comments. This approach is illustrated by the following code.

```
<!--[if interactive]>
<img src="http://myserver/mycat.jpg">
<div id="hidden-elements" style="display:none;">
<div id="mycat">MEOW</div>
</div>
<![endif]-->
```

Since the content within the block is demarcated with a <!-- and -->, they are not processed by regular email clients that support HTML. However an interactive email client can attempt to process a condition following the opening comment tag "[if interactive]" and denote that since the condition applies to interactivity and the client supports interactivity, the content within the content block will be processed as if said content are processed as if they are not hidden within a comment.

In a further embodiment, techniques that may be used to prevent interactive content from being processed by regular email clients may involve surrounding interactive content within proprietary HTML tags ie. <is_interactive> . . . </is_interactive> or escaping and encoding the interactive content in a JSON object.

The email is displayed to the user (step 309).

Figure 4:
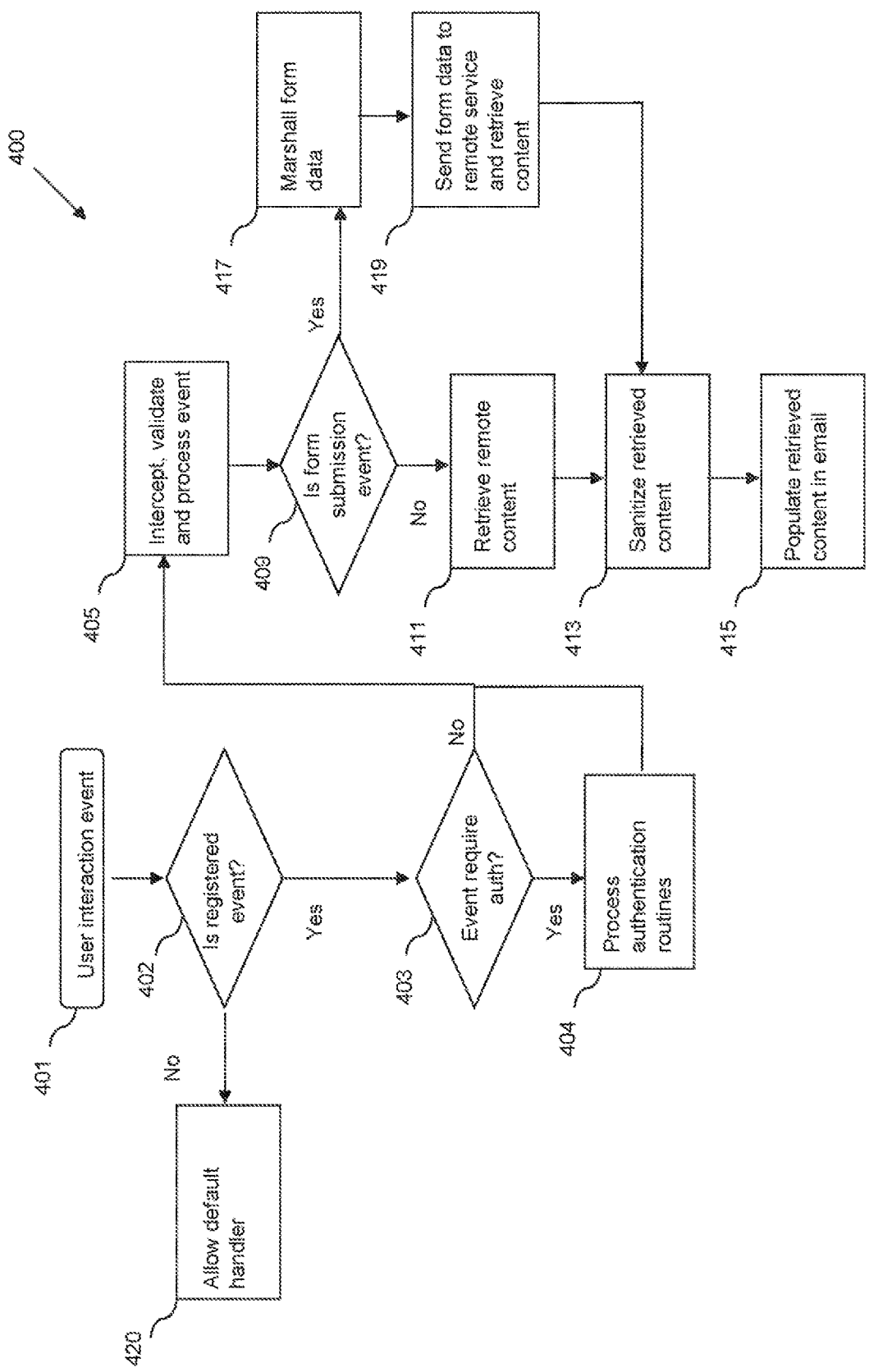
FIG. 4 is an illustration of an exemplary process flow, depicting the process of handling an interactive event within an email, in accordance with an embodiment of the present invention.

FIG. 4 is a flowchart illustrating a method 400 according to one provided embodiment. The method illustrates an exemplary process flow depicting the process of handling an interactive event within an email in accordance with an embodiment of the present invention. In FIG. 4, and with reference to exemplary system 100, the method 400 begins when a user interacts with an opened email in an email client (step 401). The interactive event is checked to see if it is one for which the application has registered interactive event listeners (step 402). An exemplary process to register event listeners involve the email client invoking the JavaScript addEventListener( ) method on an element that is determined to respond to an interactive event such as an element that contains the data-content-target attribute. Other methods of registering event listeners in HTML content is well known to those familiar with the art. If it is determined at step 402 that the application does not have a registered interactive event, it allows the event to be processed by a default handler (step 420). Otherwise, if it is determined that it is an event for which it has registered listeners, the email client checks to see if the event requires the user to authenticate with a remote content provider (Step 403). If it is determined that authentication is required, an authentication process is performed to authenticate the user (404). Upon successfully authenticating a user if authentication is required, or if authentication is not required, the email client intercepts the event preventing the event from being handled by the default event handler (ie. event.preventDefault( )) (step 405). It is then determined whether the event originates from an interactive link or a submission from a form (step 409). If it is determined at determination step 409 that the event originates from an interactive link, the "href" (or interactive URL) attribute of the source element is retrieved by the client making a request to retrieve the content from the remote content provider specified in the URL (step 411).

In one embodiment, not shown in FIG. 4, the application may check the domain of the remote URL to ensure that URL is of the same domain of the authenticated domain of the email. If the domains do not match the request may be denied. In an alternate embodiment, not shown in FIG. 4, the email client may check portions of the URL such as the domain against a whitelist or blacklist to determine if the URL should be allowed. If the URL is not allowed, no action is taken and the process flow is aborted.

After the "href" (or interactive URL) attribute of the source element is retrieved at step 411, the received content is sanitized (step 413). The process of sanitizing may include a combination of sub-processes and may utilize routines similar to those described at step 303 of FIG. 3. The sanitizing routines, may include, for example, the removal of scripts that can be natively executed by a Web Browser such as JavaScript, CSS styles, unsupported HTML elements such as iframes and the modification of ids and class attributes from elements. The process to remove disallowed content from email content specifically HTML email content is well known to those of ordinary skill in the art and will not be further described. Similar to step 303 of FIG. 3, names of id and class attributes of elements may be modified to prevent conflicts with the application's own classes and ids. Once the content has been sanitized, the email client locates the element within the email with an id corresponding to the value in the link or form's data-content-target and populates the content within that element (step 415).

If it is determined at determination step 409 that the event originated from a form submission event, the information in the form is collected (step 417) and the form data is sent to a remote content provider (step 419). In various embodiments, sending form data to the remote content provider may include: POST, GET, PUT or any form acceptable to the receiving service based on the URL of the form specified in the form action attribute or other special URL attributes associated with the form or form elements. Content from the response of the call to the remote content provider is then retrieved and the process flow then continues to the sanitizing routine (Step 413). The retrieved content is then populated into the contents of the email (step 415).

In other embodiments, it is contemplated to use other means of referencing target elements instead of the element's id attribute. For example, instead of using 'id', it is contemplated to use classes or special attributes added to the target elements such as a data-container-id attribute.

Authentication

Certain requests to retrieve content may require that interactive email events be authenticated to ensure that a particular request from an email client is being made on behalf of a user known by the remote content provider, where such a user may, for example, be the intended recipient of the email. An example of an action that requires authentication is adding a product into a shopping cart of a user at the remote content provider through an action taken within an interactive email.

One method for identifying a user to a remote content provider is by encoding the id of a user at the remote content provider or the user's email address into the link or form data when the email is created so that the user's id is sent back to the remote content provider during the interactive request from the email client. However, this is problematic because anyone having access to the email would then also be able to make the request as the original recipient.

There will now be described a simplified mechanism to allow authenticated interactive email requests from an email client to a remote content provider.

The sender may mark an email requiring authenticated requests by either adding meta-data in the email within the header or the body of an email such as shown in the code below, intended to be included in an email header:

X-interactive-with-auth: 1

The sender may also selectively mark interactive events requiring authenticated requests by adding an annotation such as "with-auth", as shown in the code below.

<a "href"="http://server/request.html" data-content-target="foo" with-auth>Get Info</a>

Figure 5:
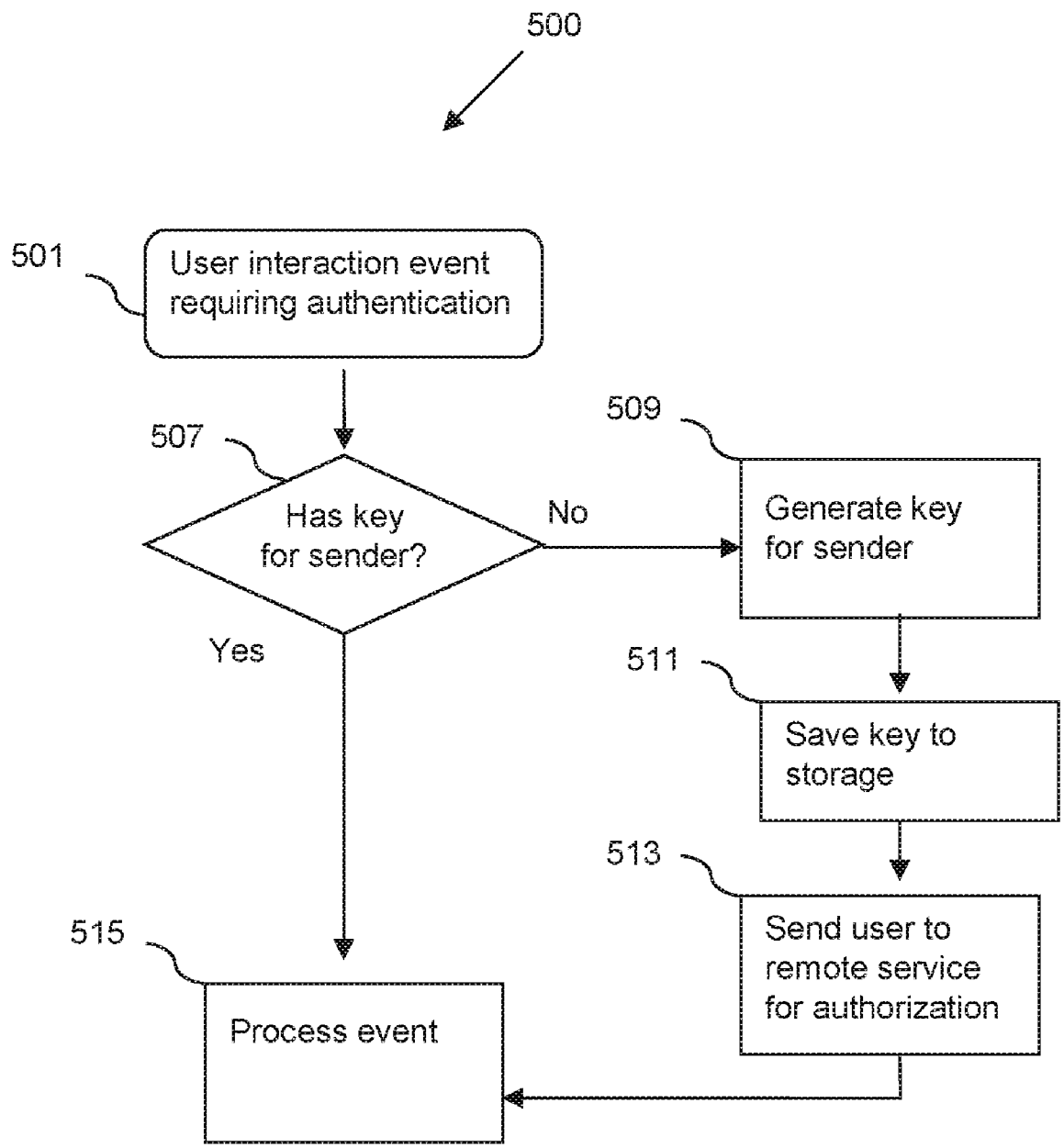
FIG. 5 is an illustration of an exemplary process flow, depicting the process of authenticating a user with a remote content provider, in accordance with an embodiment of the present invention.

FIG. 5 is a flowchart illustrating a method according to one provided embodiment. The method illustrates an exemplary process flow 500 of a process for handling the authentication of a user with a remote content provider. The described process relates to interactive content retrieved from a remote content source, such as sender web server 107, as shown in FIG. 1, which requires authentication and would be performed prior to retrieving remote interactive content upon a user interaction event.

In a preferred embodiment of the invention this process flow is generally indicated at step 404 of FIG. 4 (labeled—process authentication routines), which occurs after a user has initiated an interaction within an email. A process authentication routine is described in detail with respect to the process flow of FIG. 5 described as follows. The process flow begins when a user interaction event that requires authentication is detected in an email by an email client (step 501). Next the email client determines whether it has an authentication key for the sender (step 507). In a preferred embodiment the authentication key comprises a 128 bit universally unique identifier (UUID). The sender, in this context, may comprise, for example, an email address, or a domain of the sender. If it is determined at step 507 that the client does not have such a key, then an authentication key is generated for the sender, associated with the logged in user of the email client (step 509). The generated key is then saved in storage (step 511). Otherwise, if a key exists for the sender, the key is retrieved. The user is then sent to the sender's website (remote content provider) in a browser instance to log in and authenticate with the remote content provider using the key (step 513). At step 513, the process of authenticating the user includes presenting information to the user on the remote content provider to allow the user to confirm that the user would like to associate a key with the user's account at the remote content provider. When the user confirms the user's desire to associate the key by selecting an option to confirm within a user interface displayed at the remote content provider, the generated key is associated with the user's account at the remote content provider and saved in storage so that future interactive email requests from the email client containing the key will be associated with the user's account at the remote content provider.

Once the email client has a key for the email sender (at said remote content provider), an interactive request for content can be made that includes the generated key to allow the remote content provider to authenticate the request and associate the request to a user account by locating the stored key in storage and identifying which user account it is associated with (step 515). A remote content provider may reject an authenticated request and require a user to re-authenticate. This can be done with an authentication failure code in the response, for example, a HTTP status 401 for Unauthorized. When such a response is detected the email client may generate a new key at step 509 and repeat the authorization process at step 513.

In a preferred embodiment, the authentication URL of the remote content provider is embedded in the email. This may be achieved by embedding the authentication URL in the email header or by embedding meta-data within the email body. In one embodiment, the authentication URL of the remote content provider is hosted on a Domain Name System (DNS) service and associated with the domain of the email sender. This can be done by specifying the authentication URL as a TXT or text field in the DNS entry for the sender's domain.

In a preferred embodiment, the key along with other identification information of the user at the email client is sent to the remote content provider so that the identification information can be displayed to the user upon visiting the remote content provider and allow the user to confirm that the user would like to associate the generated key with the user's account at the remote content provider. Information that may be sent to the remote content provider may include the email address of the user's account associated with the email client, the name of the user, a timestamp, the email client name, and the email client's domain. To authenticate the request, data may be encrypted or signed by a private key associated with the email client. In a preferred embodiment, the remote content provider will have access to the email client's public key and will be able to authenticate the request as being sent by the email client. If the sender's server is unable to authenticate the request, the request may be rejected.

In a preferred embodiment, the public key may be hosted on a DNS and may comprise the public key used for email authentication such as the DKIM. In a preferred embodiment of the invention, interactive email requests for content or authentication to remote content providers from an email client are signed and the receiving services utilize the public key hosted on a DNS to authenticate such interactive email requests.

Identification information of a user may be embedded within an interactive email by a sender and sent along in a request to strengthen the security. The remote content provider may check to ensure that the identification information of the user matches the key sent by the email client in its storage before allowing the request to proceed. Alternately the user's email address may be sent to the remote content provider as part of the request to allow the remote content provider to identify the user making the request.

In other embodiments, methods of authentication, other than what is described above, may be employed such as, for example, using the OAuth2.0 method where a key is generated by the remote content provider and passed to the email client to be associated with the user of the email client and stored and used for authentication requests to the remote content provider. The mechanism behind OAuth2.0 is well known to those of ordinary skill in the art and will not be further described.

Examples are provided below directed to retrieving remote content for two scenarios, i.e., (1) link based implementation and (2) form based implementation.

In general, the present invention allows for the retrieval of remote content when a user interacts with elements in an email. More specifically the present invention allows for the retrieval of remote content when a user takes action on a "link" as well as when a user submits a "form" within the email. The interactive capability is enabled using special annotations which are present in both link and form elements in the email content.

Example 1

Basic Interactive Link Based Email Implementation

Figure 6A:
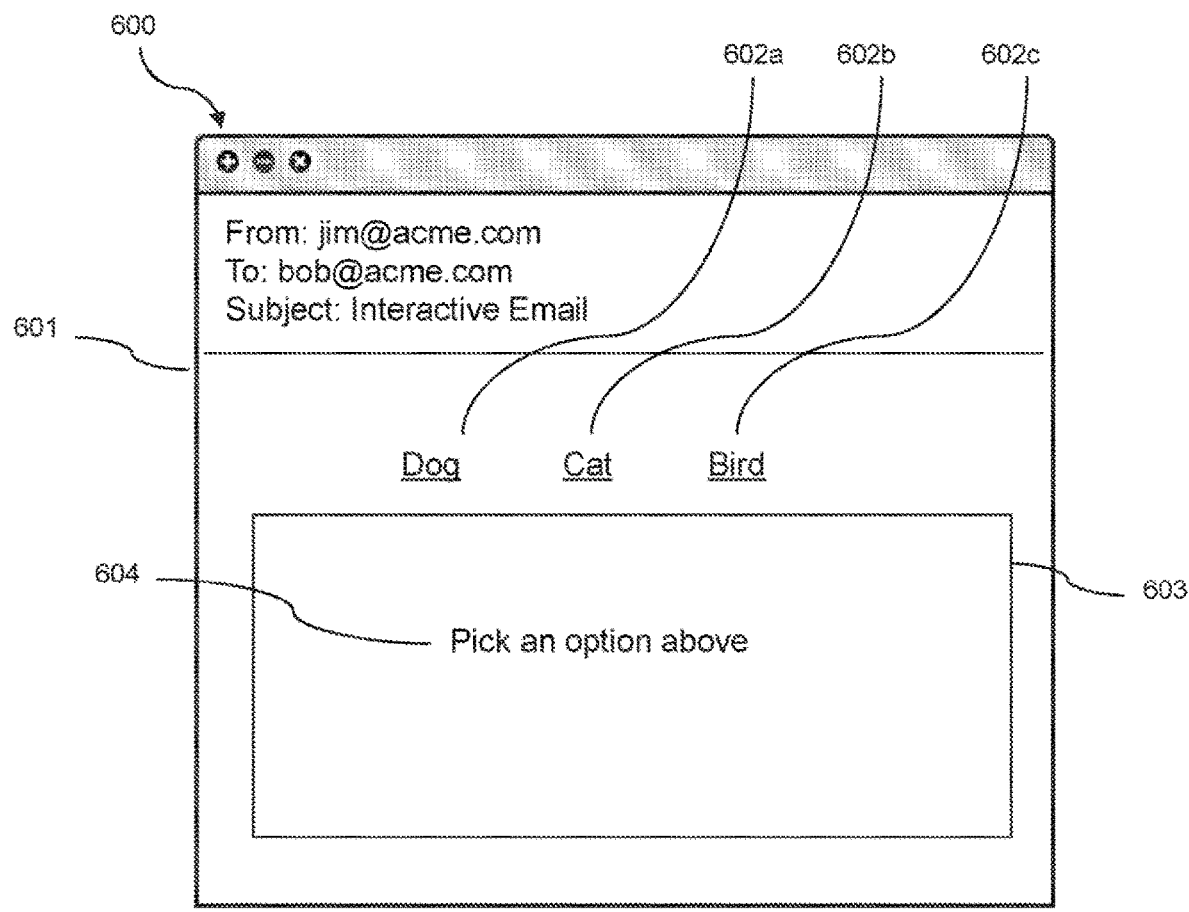
FIG. 6a is an illustration of an email client displaying an email containing interactive content within the email, the content comprising HTML and CSS code.

FIG. 6a illustrates a window 600 in an email client for a link based implementation of the invention for retrieving remote content from a remote content source. As shown in FIG. 6a, the exemplary link based email 601 includes three interactive elements 602a, 602b, 602c and an interactive container 603 including default content 604. The default content 604 comprises content that is displayed to a user before any interaction between the user and the email has taken place. The default content 604 is optional. In the present example, the interactive elements 602a-c, container and 604 and default content 604 are written in HTML and CSS code. The interactive container 603 can be any HTML element that can contain child HTML elements such as, for example, without limitation, div, span, p, table, and td.

Figure 6B:
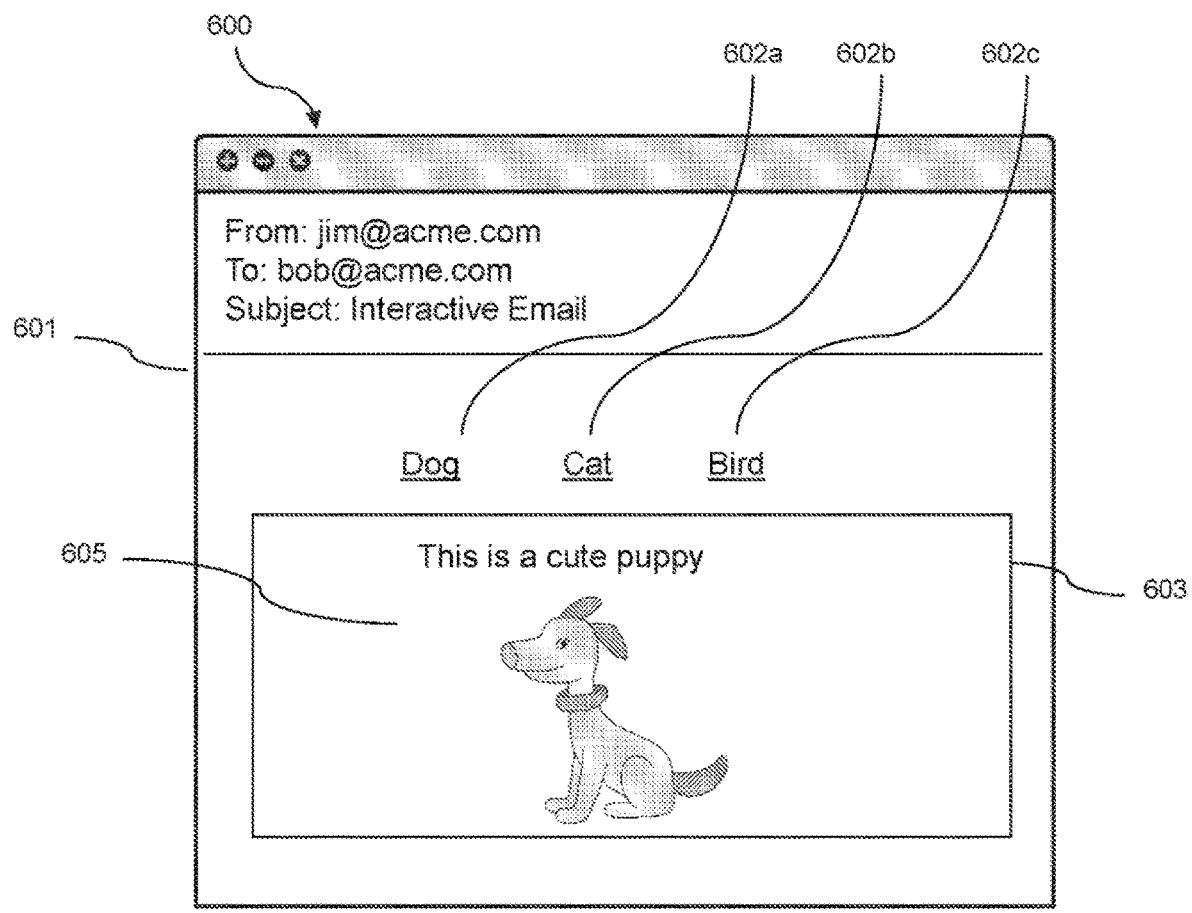
FIG. 6b is an illustration of an email client displaying an email containing interactive content within the email where new interactive content has been fetched into the email.

FIG. 6b illustrates the window 600 of FIG. 6a that is displayed to a user after the user has clicked on or otherwise interacted with one of the interactive links 602a-c of FIG. 6a. As shown in FIG. 6b, upon clicking on interactive link 602a of FIG. 6a, the system retrieves remote content 605 and displays the content within the interactive container 603.

FIG. 7a illustrates the code corresponding to the various elements of window 600 shown in FIG. 6a. For example, interactive links 602a-c correspond to code elements 701a-c. The code elements 701a-c are annotated with a corresponding "href" attribute 704a-c, referencing remote HTML content and a corresponding data-content-target attribute 705a-c, referencing the id (e.g., foo) of an interactive container 702.

According to a key feature of the invention, whenever any interactive link 602a, 602b, 602c is clicked on or selected in the window 600 of FIG. 6a, instead of opening a browser or new browser window (as in the case of a Web-based email client) to load the link, as is conventional, the enhanced email client retrieves interactive and/or dynamic content from a remote server 107 as referenced by the "href" attribute 704a-c associated with the selected link. For example, by clicking on link 602a, remote content is retrieved from sender web server 107 as referenced by the link referenced by the code element 701a.

FIG. 7b illustrates sample HTML code defining remote content retrieved from the sender web server after the selected link has been clicked. The code 710 is retrieved and sanitized as per step 413 in FIG. 4 and populated in the within the area defined in the interactive container code 702. As shown in FIG. 6B. the retrieved remote content 605 is inserted into the interactive container 603.

While the present example illustrates the use of a link with an "href" attribute, other methods may be used in alternative embodiments. For example, in an embodiment, a special attribute "data-content-URL" may be used in place of the "href" attribute and may be applied to any element to turn a non-link element into an interactive link, as shown below.

<div data-content-URL="http://server/dog.html" data-content-target="foo">Dog</div>

Example 2

Basic Interactive Form Based Email Implementation

Figure 8A:
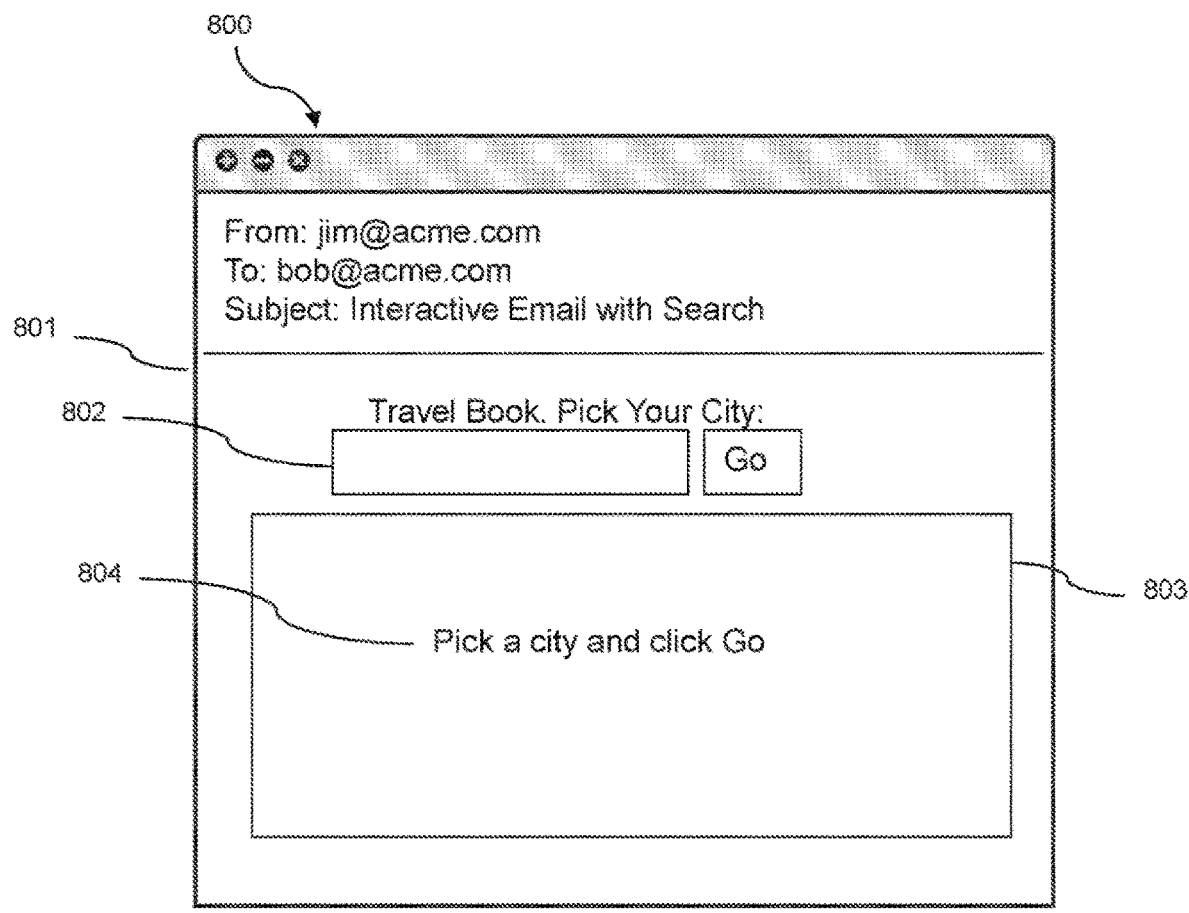
FIG. 8a is an illustration of an email client displaying an email containing interactive content and form elements within the email.

FIG. 8a illustrates a window 800 in an email client for a form based email implementation of the invention for retrieving remote content from a remote content source. As shown in FIG. 8a, the exemplary form based email 801 includes an interactive form 802 and an interactive container 803 containing default content 804. The default content 804 is optional. In an embodiment of the invention, the content of the email comprises HTML and CSS code.

Figure 8B:
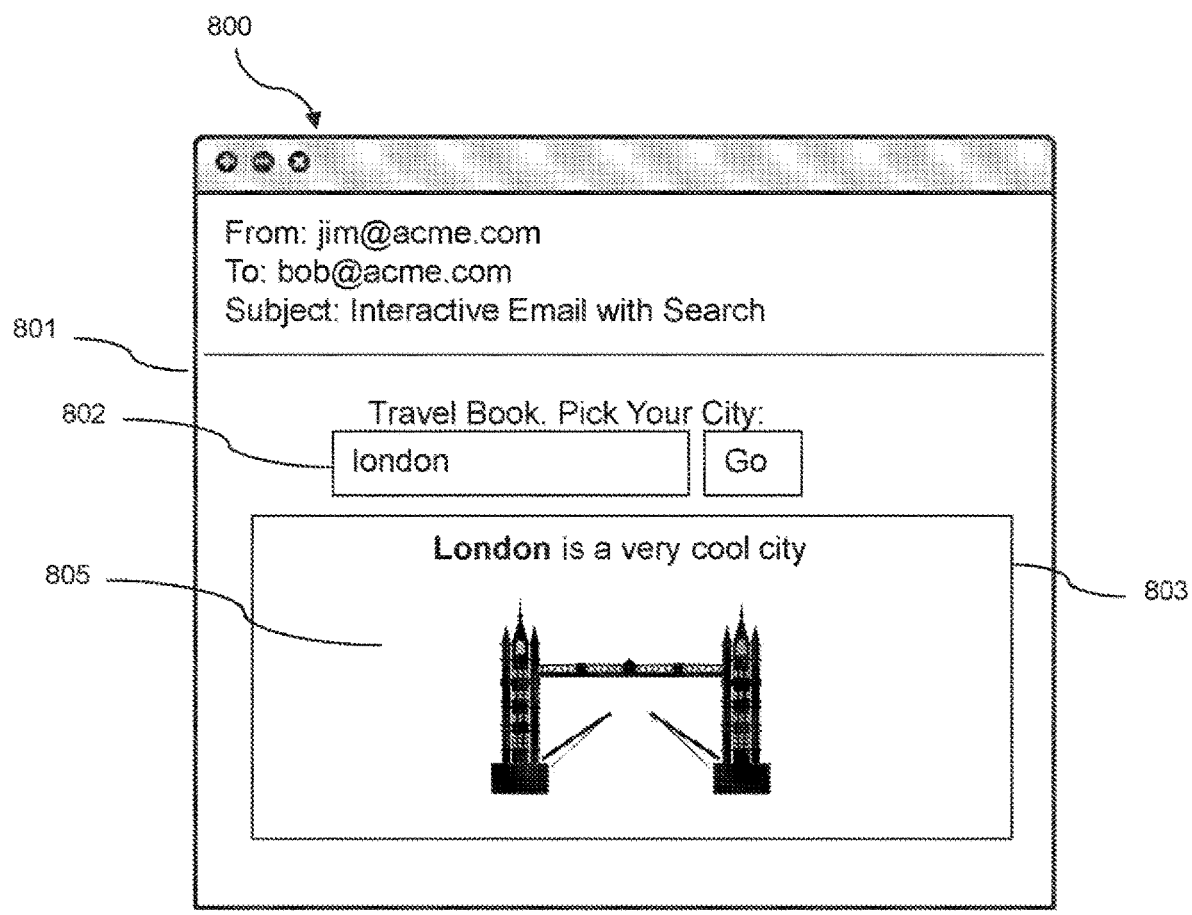
FIG. 8b is an illustration of an email client displaying an email containing interactive content and form elements within the email where new interactive content has been fetched from a remote content provider into the email.

FIG. 8b illustrates the window 800 of FIG. 8a that is displayed to a user after the user has interacted with the interactive form by inputting data into input element 802 of the interactive form and submitted the form causing newly retrieved remote content 805 to be displayed within the interactive container 803.

FIG. 9a illustrates the code that corresponds to the various elements of window 800 shown in FIG. 8a. For example, email contains an input element 802 corresponds to code element 902. Interactive container 803 corresponds to code element 905. The interactive form 901 contains an action attribute 903 that denotes where the form should be submitted upon a user submitting the form and a "data-content-target" attribute 904 referencing the id attribute ("foo") of an interactive container 905. The interactive container may contain default content 906 that may be displayed when the email is initially opened.

When an interactive form is submitted, as defined by code element 901, instead of opening a browser and submitting the content, as is conventional, a feature of the invention is the collection of form content by the enhanced email client for submission to a remote content provider with the URL referenced in the action attribute 903. Remote content is then retrieved from said remote content provider, (an exemplary embodiment of the remote content is shown in FIG. 9b 910) sanitized as per step 413 in FIG. 4 and populated in the interactive container 905, replacing any default content 906 if present, said interactive container 905 shown rendered in the interface on FIG. 8b as 803 and the rendering of the remote content as 805.

In various embodiments, methods other than the one described above to determine the URL of a form submission are contemplated for use. For example, in one embodiment, special form-submit attributes can be put onto form elements containing a URL. In another embodiment, the HTML5 form action attribute on input elements may be used.

Swapping of Interactive Content

An advantage of retrieving content from remote servers when users interact with elements within the email is that the latest content can be fetched to display within the interactive content container. In an embodiment, instead of retrieving interactive content from a remote server, the interactive content can be advantageously retrieved from other parts of the email that is hidden from the user prior to being retrieved. For example instead of a "href" attribute in an interactive link, as shown in 701a in FIG. 7a, the link may instead contain a "data-content-source" attribute pointing to the element id of a hidden element within the email content, as shown in the code below. Elements may be initially hidden from a user either by using CSS or by embedding the element in HTML comments. Other methods of hiding content in HTML familiar to persons skilled in the art may also be used.

<a data-content-target="foo" data-content-source="xyz">Dog</a>

Then when a user performs an action on the link above such as clicking it, the email client will locate an element with the element id of "xyz" as well as another element with the element id of "foo" and replace the content within the element with the id of "foo" with content within the element with the id of "xyz".

In one embodiment, the email client may also require permission from the user before enabling interactive content. The email client may retrieve a flag to determine permission and if no permission for interactive content is given for a specific sender (or domain of the sender), the user is shown an option in a user interface to enable interactive email for the sender. If the user confirms permission to enable interactive email through the user interface, the email client may save such a permission so interactive content is displayed in the email automatically for subsequent emails.

Automatic Loading of Interactive Content

In an embodiment, interactive email content may be loaded using an annotation on a containing element so that fresh interactive content can be loaded when an email is opened.

A tag such as the one in the code shown below containing "data-onload-refresh" may include the URL of the interactive content to be loaded and subject to the sanitization routines in step 413 of FIG. 4.

<div data-onload-refresh="http://server/remote-content.html" data-refresh-seconds="5">default placeholder</div>

As described in step 413 of FIG. 4, sanitization may include the removal of scripts such as JavaScript, CSS styles, unsupported HTML elements such as iframes and the modification of id and class attributes of elements. The process of removing disallowed content from email content, specifically HTML email content, is well known and will not be further described.

As stated above, it is noted that names of both id and class attributes of elements may be modified to prevent potential conflicts with the application's own class and id attributes.

When interactive content is loaded within an interactive container, a further attribute can be added to the container to denote whether the content should be refreshed periodically. In a preferred embodiment, an attribute "data-refresh-seconds" denotes that the email client should retrieve new content from the URL specified in "data-onload-refresh" after a number of seconds specified in the "data-refresh-seconds" attribute.

Styling of Interactive Elements

In a preferred embodiment, the interactive elements can also be annotated with attributes to set a CSS class to an interactive element when a user has taken action upon the interactive element. For example a link may be styled as follows:

<a "href"="http://server/foo" data-content-target="foo" data-set-class="clickedLink">Foo</a>

When a user clicks on a link with a data-set-class attribute, the email client sets the class of the element to "clickedLink". Another attribute may be designated to ensure that a class is exclusively set on an element and no other element within the email.

For example, an attribute data-set-class-last="activeLink" may be set on multiple elements but only have the last clicked element assigned the activeLink class. The email client will ensure that no other element within the email will contain the activeLink class after an element containing the attribute is clicked by removing the activeLink class from other elements within the email.

Another attribute may be data-toggle-class="isOn" where the "isOn" class is toggled on the element when a user interacts on said element.

In accordance with one aspect of the invention, user actions are allowed to be performed on one element to modify the class of a different element. Therefore, a user action on element can influence the styles of other elements within the email.

The following code illustrates, by way of example, two div elements with the first div element having the attribute data-set-class set to "foo:xyz". This format specifies the id attribute of the second div element (foo) and the class to be set ("xyz") to the class when the element is clicked, as shown in line 1. When a user clicks on the first div element, the email client will apply the class "xyz" to the element with the id "foo", as shown in line 2. This allows a user action on one element to influence the styles of other elements within the email.

```
1    <div data-set-class="foo:xyz" data-trigger-type="click">Change</div >
2    <div id="foo">Target</div>
```

Displaying Values of Named Variables

Stored named variable values can be displayed in the content of an interactive email by either referring to the named variable using an attribute in an element or by referring to an element when a user interacts on an element. Named variable state is maintained by the email client.

The code below displays the value of a named variable "counter" in the element. The client parses for elements with the data-display-variable attribute and locates the value of a named variable "counter". If such a value exists it is inserted within the content of the element making the value visible in the email.

<div data-display-variable="counter"></div>

In an embodiment, it would be useful to incorporate the concept of variables in interactive email where values can be assigned and computed and then output in response to user actions in interactive email. Since traditional applications and scripts such as Javascipt are commonly blocked in email clients as they are deemed too powerful and risky, a limited form of scripting capability may be an advantageous alternative. In such an embodiment, the sanitization routine in steps 303 in FIG. 3 and 413 in FIG. 4, may be modified to allow this limited form of scripting as defined below while generally removing other forms of scripts that can be natively executed by a Web browser such as JavaScript. Such ability may limit the capability to assign integers to variables and perform simple calculations to variables such as the ability to add, subtract, multiply and divide.

Named variables can be declared with varying scope such as, for example, transient, email, sender and domain. Values can be assigned to the variables and computed and then output in response to user actions in the interactive email. In an example of a variation of the first and second embodiments, a limited scripting capability is provided, limited to assigning integers to variables and performing simple calculations to variables such as the ability to add, subtract, multiply and divide. Preferably, named variables can be declared with varying scope using an attribute "scope". Named variable scopes may for example include:

Transient—Named variables will have their values reset when the email is closed and reopened.

Email: Named variables will retain their values over multiple opens of the same email Sender: Named variables will retain their values over multiple emails from a sender, which may be identified from an email address.

Domain: Named variables will retain their values over multiple emails from a domain, such emails may be send from varying email addresses with the same domain name.

In all cases, the scope implicitly associates the named variables to the recipient of the email message, so multiple recipients of the same email message would not share or be able to access one another's named variable states. The email client may store the named variables and their associated scope and values in storage, associating the named variables with the recipient of the email for later retrieval. When an email is opened, the email client may retrieve named variables appropriate to the scope of the initial named variables and have the values accessible to the newly opened email including initializing named variables in the opened email message. Alternatively instead or in additional to the recipient, scope of named variables may be associated with the account of the user of the email client.

Setting and Initializing Named Variables

The following sample code is an example of a declaration of a named variable (e.g., counter) with the scope "sender", default value of 10. The code uses a hidden form field with an attribute of "data-variable".

<input type=hidden data-variable=true name="counter" default="10" scope="sender">

In other embodiments, other methods may be used to declare and store variables within an email such as, for example, using JSON structures. In a preferred embodiment, the email client application detects input elements with attribute "data-attribute" and then uses the attributes of the input field as values to initialize a named variable.

The email client will process elements for variable modification attributes such as "set-variable" and when it encounters such an attribute in the code it will use the value of the attribute as a means to modify a named variable.

The code shown below is an example of an interactive element that increase the variable "counter", shown in the code above, by +1 when a user interacts with the element by clicking on the element or by other means.

<div data-trigger-type="click" set-variable="counter: counter+1">Increase Counter</div>

In a preferred embodiment, the value of named variables including named variables initialized in prior emails that is within the same scope of the current email, may also be sent to a remote content provider when interactive content is fetched from a remote server as part of the request. In a variation of this embodiment, the remote content provider may also return content containing instructions to modify values of named variables that are processed and executed upon by the email client. As an example, the code below may be returned by a remote content provider as a response to a content retrieval that will cause the client application to increment the value of the "counter" named variable by 100 or if no value exists, to set the default value to 50, as shown in line 2.

```
1    <input type=hidden data-variable=true name="counter"
2    value="counter+100" default="50" scope="sender">
```

The code below is an example of a declaration of a named variable (e.g., counter) with the scope "sender" with a default value of "10" using a hidden form field with an attribute of "data-variable". The scope attribute determines the scope of whether and which other emails will have access to the value of this named variable. Other methods to declare and store variables within an email may be employed such as using JSON structures. In a preferred embodiment, the email client application will detect input elements with attribute data-variable and then use the attributes of the input field as values to initialize a named variable.

```
<input type=hidden data-variable=true name="counter" default="10" scope="sender">
```

The following code illustrates by example an interactive element that will increase the named variable (counter) by +1 (see code above) when the user clicks on, or otherwise interacts with the element. The email client will process elements for variable modification attributes such as "set-variable" and when it encounters such an attribute it will use the value of the attribute as a means to modify a named variable.

```
<div data-trigger-type="click" set-variable="counter:counter+1">Increase Counter By 1</div>
<div data-trigger-type="click" set-variable="counter:100">Set Counter to 100</div>
<div data-trigger-type="click" set-variable="gender:'male'">Set Gender to 'Male'</div>
```

In a preferred embodiment, the value of named variables may also be sent to a remote content provider when interactive content is fetched from a remote server as part of the request. The remote content provider may also return content containing instructions to modify values of named variables that are processed and executed upon by the email client.

The code below may be returned by the remote content provider as a response to a content retrieval that will cause the client application to increment the value of the "counter" named variable by 100 or if no value exists, to set the default value to 50.

```
<input type=hidden data-variable=true name="counter" value="counter+100" default="50" scope="sender">
```

Displaying Values of Named Variables

Stored named variable values can be displayed in the content of an interactive email by either referring to the named variable using an attribute in an element or by referring to an element when a user interacts on an element. The following code displays the value of a named variable "counter" in the element. The client parses for elements with the data-display-variable attribute and locates the value of a named variable "counter". If such a value exists it is inserted within the content of the element making the value visible in the email.

```
<div data-display-variable="counter"></div>
```

It can also be advantageous to set class attributes on elements using stored named variable values to determine the layout and display of elements within an email using CSS selectors. In one embodiment, use is made of the attribute "data-variable-set-class" where the value of a variable is added to the class of the element. This feature is illustrated by the following code example. If a stored named variable "gender" has the value of "male", the following code highlights those elements within the email containing the class attribute "male-item" with a blue border.

```
<style>
.male .male-item{border:1px solid blue;}
.female .female-item{border:1px solid pink;}
</style>
<div data-variable-set-class="gender">
   <div class="male-item">Male item</div>
   <div class="female-item">Female item</div>
</div>
```

Prebuilt Interactive Components

It is advantageous that an email client that supports interactivity provide certain prebuilt interactive visual components such as carousel or rollover images. This allows senders to leverage interactive components without having to implement them within the HTML and CSS of the email content and merely refer to these features to utilize them.

Image Carousel

An image carousel is a visual component that can display multiple images by having the image swap or slide within a limited space, either automatically or with user interaction. The implementation of image carousels using web browser natively executable scripts such as Javascript are well known to those skilled in the art. According to one aspect, the invention uniquely allows for the configuration and control of a prebuilt image carousel component using annotations within elements in HTML. As shown below, by way of example code, the content of the email does not contain the actual implementation of an image carousel but merely refer to the image carousel component within an attribute.

The code below is an example of one method for invoking the inclusion of an image carousel component by using an attribute "data-widget" with a value "carousel". The "data-widget-content" attribute includes initialization values that contain the images as well as links associated with the images to populate the image carousel. When the enhanced email client detects the "data-widget" attribute, the client checks to see if the email client supports the interactive component referenced (carousel). If there is support, the component will be initialized with the value or values specified in the data-widget-content attribute. If the initialization succeeds, the visual rendering of a carousel as well as user controls to manipulate the carousel through the multiple elements within the carousel will be displayed within the element containing the data-widget attribute.

```
<div data-widget="carousel" data-widget-content
="{img:'http://server/dog.jpg';link:'http://server/dog},{img:'http://server/cat.jpg';link:'http://server/cat},{img:'http://server/rabbit.jpg';link:'http://server/rabbit'}"></div>
```

In an alternate embodiment, the content within an interactive component may be retrieved from elements hidden in the email content. In the code below, the content within the carousel interactive component is defined within an element with and element identifier "foo". Elements may be hidden from a user either by using CSS or by embedding the element in HTML comments. Other methods of hiding content in HTML familiar to persons skilled in the art may also be used.

<div data-widget="carousel" data-widget-source="foo"></div>

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure focus of the invention. The invention is capable of myriad modifications in various obvious aspects, all without departing from the spirit and scope of the present invention. Accordingly, the drawings and descriptions are to be regarded as illustrative in nature and not restrictive Generally, program modules may include routines, programs, objects, components, data structures, etc., that perform particular tasks or implement particular abstract data types. Computer-executable instructions, associated data structures and program modules represent examples of program code for executing the methods disclosed herein. The particular sequence of such executable instructions or associated data structures represents examples of corresponding acts for implementing the functions described in such steps or processes For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." In addition, the articles "a" and "an" as used in this application and the appended claims should generally be construed to mean "one or more" unless specified otherwise or clear from the context to be directed to a singular form.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise The foregoing detailed description of the system has been presented for purposes of illustration and description. It is not intended to be exhaustive or to limit the system to the precise form disclosed. Many modifications and variations are possible in light of the above teaching. The described embodiments were chosen in order to best explain the principles of the system and its practical application to thereby enable others skilled in the art to best utilize the system in various embodiments and with various modifications as are suited to the particular use contemplated. It is intended that the scope of the system be defined by the claims appended hereto.

What is claimed is:

1. A computer-implemented process to securely display interactive content in electronic mail (email), the process comprising:
   receiving, by a computing device including at least one processor, an email message sent from a sending email server:

processing, by the computing device, the received email message, the processing comprising:
  determining if the received email message is an interactive email message containing interactive content, wherein the interactive content comprises one or more annotated element and one or more interactive content container element;
  in response to a determination the received email message is an interactive email message:
    displaying at least one of the one or more annotated element;
    in response to an interaction event between a user and a first annotated element selected by the user from among the one or more annotated element, executing, by the computing device, processor executable program instructions causing the at least one processor to perform operations comprising:
      (a) retrieve placement content from a content source;
      (b) place the retrieved placement content within at least one of the one or more interactive content container element in the email; and,
      (c) display the placement content; and
  wherein in response to opening the email, the operations performed by the at least one processor further comprises displaying an email element value set in a previous opening of the email.

2. The method of claim 1, wherein the annotated element contains a named reference to the at least one or more interactive container element in the email.

3. The method of claim 2, wherein the annotated element is an annotated link.

4. The method of claim 2, wherein the annotated element is an annotated form, and wherein the interaction event further comprises a form submission event.

5. The method of claim 1, wherein the annotated element contains a content source identifier referencing the source of the placement content.

6. The method of claim 5, wherein the placement content is defined within an email content element hidden from the user.

7. The method of claim 5, wherein the content source identifier further comprises at least one URL specifying the domain name of a remote server providing access to the placement content.

8. The method of claim 7, wherein the operations performed by the at least one processor in response to the interaction event further comprise sending to the remote server an authentication key generated to authenticate the user.

9. The method of claim 7, wherein the operations performed by the at least one processor in response to the interaction event further comprise: compare the domain name of the remote server specified by the content source identifier to the authenticated sender domain name of the email; and wherein retrieve the placement content further comprises the placement content retrieved only if the domain name of the remote server specified by the content source identifier and the authenticated sender domain name match, based on the comparison.

10. The method of claim 1, wherein the operations performed by the at least one processor in response to the interaction event further comprise sanitize the placement content, wherein sanitize the placement content comprises removing disallowed content from within the placement content before displaying the placement content.

11. The method of claim 10, wherein disallowed content further comprises at least one CSS style.

12. The method of claim 10, wherein disallowed content further comprises at least one HTML element.

13. The method of claim 1, wherein in response to an interaction event between a user and a first annotated element, the operations performed by the at least one processor further comprise:
  determine if the interaction event is the first interaction by the user with the first annotated element since receiving the email message;
  upon a determination the interaction event is the first interaction by the user with the first annotated element:
    update a variable specified in the first annotated element;
    update a second element within the email to display the value of the updated variable specified in the first annotated element; and,
    store the value of the updated variable specified in the first annotated element, wherein the stored updated variable value is persisted, and wherein the persisted value is retrievable by the at least one processor upon subsequent opening of the email.

14. The method of claim 1, wherein processing, by the computing device, the received email message further comprises processing by an email client executing as processor executable program instructions executed by the at least one processor.

15. The method of claim 1, wherein processing, by the computing device, the received email message further comprises processing by a web browser executing as processor executable program instructions executed by the at least one processor.

16. The method of claim 15, wherein processing, by the computing device, the received email message further comprises processing by an add-on to the web browser executing as processor executable program instructions executed by the at least one processor.

17. The method of claim 1, wherein processing, by the computing device, the received email message further comprises processing by a system service executing as processor executable program instructions executed by the at least one processor.

18. The method of claim 1, wherein processing, by the computing device, the received email message further comprises processing by a cloud service operably coupled with the at least one processor.

* * * * *